Aug. 11, 1964

T. G. HILL 3,144,222

FEEL TRIM UNIT

Filed June 21, 1962

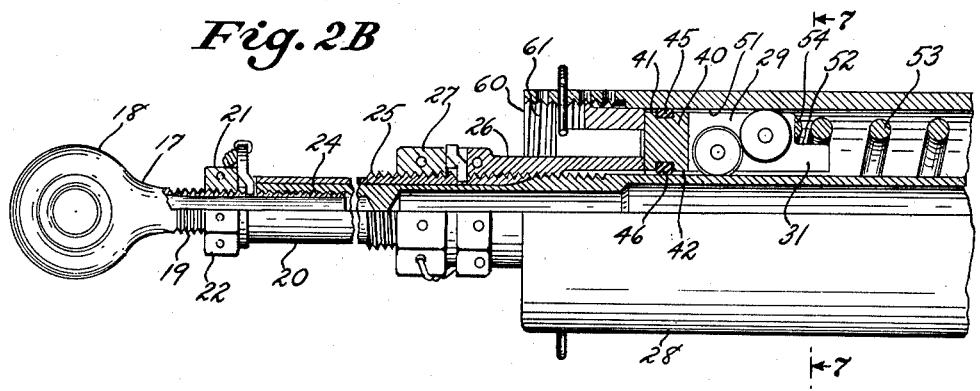
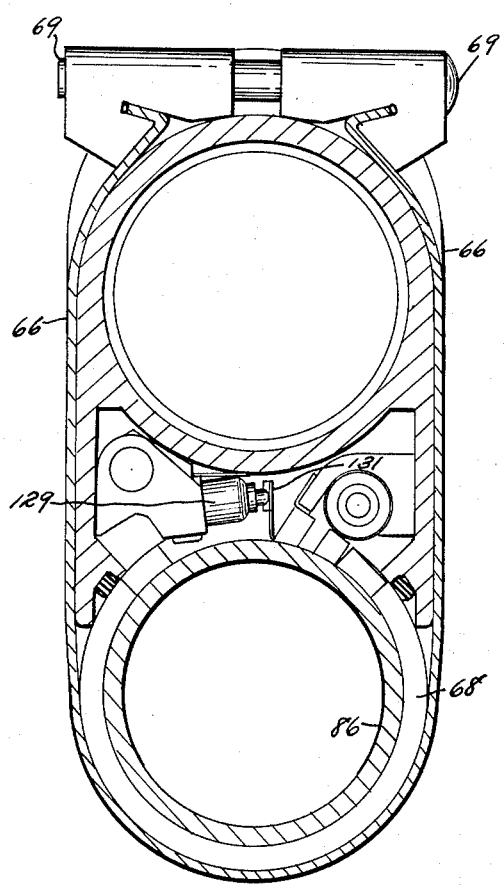
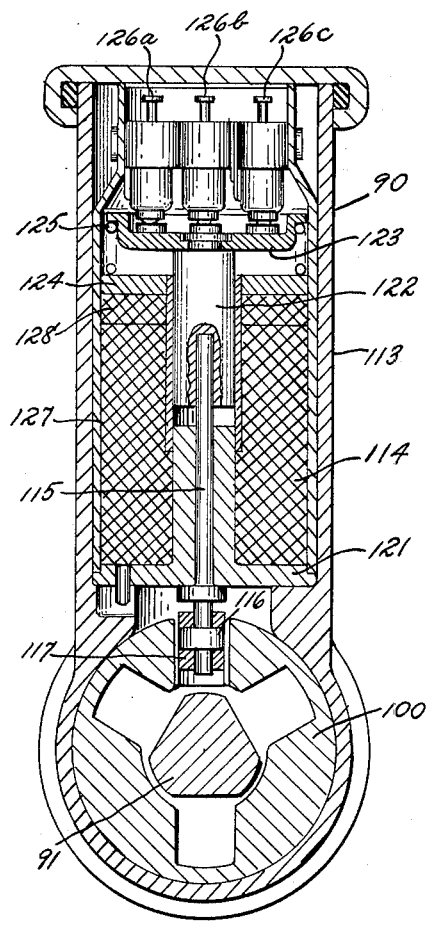

Aug. 11, 1964 T. G. HILL 3,144,222
FEEL TRIM UNIT
Filed June 21, 1962 3 Sheets-Sheet 3

United States Patent Office 3,144,222
Patented Aug. 11, 1964

3,144,222
FEEL TRIM UNIT
Thomas Gardner Hill, Glen Cove, N.Y., assignor to Lundy Electronics and Systems, Inc., Glen Head, N.Y.
Filed June 21, 1962, Ser. No. 204,122
6 Claims. (Cl. 244—83)

This invention relates generally to the field of control means for varying the relative position of aircraft control surfaces, and more particularly to an improved feel trim unit capable of imparting a resilient force to a control linkage, under such conditions as the same is required.

During the course of level flight, the passage of air over aircraft control surfaces provides a force on each of said surfaces which is overcome by the pilot in manually moving a stick control in the cockpit. When the controls are in neutral position, these forces are neutralized, so that the pilot has a definite feeling from the stick control indicating such neutral condition. Movement of the stick in any direction from such neutral position requires the overcoming of the above-mentioned forces, which become progressively greater as the control surfaces are moved further from the neutral position.

In the case of helicopter and similar aircraft capable of both horizontal and hovering flight, the forces obtained from the control surfaces, as described above, are present when the aircraft is in translational flight, but in hovering flight the control surfaces have no such force against which to work, resulting in a lack of resistance at the stick control so that the pilot has difficulty in determining when the controls are in neutral position. This condition is further complicated by the fact that with the shifting of weight loads, resulting in tail heaviness or nose heaviness, the neutral position for any given loading will vary, so that, in some cases, the neutral position may be such that the stick control is moved to a point either forward or rearward of a direct vertical condition, or a previous neutral position. By means of the present invention, it is proposed to provide a resilient unit which may be selectively connected to the control linkage between the stick control and control surfaces of the aircraft, which will simulate the resistance normally obtained with level flight, so that the pilot will have an indication of a positive neutral position of the stick control under any given set of conditions.

It is therefore among the principal objects of the present invention to provide an improved device of the class described, which may be referred to as a feel trim unit, which may include a resilient unit which may be selectively interconnected between an aircraft control linkage and a fixed member on the aircraft, to simulate the effect of moving air over aircraft control surfaces under such conditions where normal resistance is absent.

Another object of the invention lies in the provision of an improved feel trim unit in which the complete operation of the same is completely under the control of the pilot at all times.

A further object of the invention lies in the provision of an improved feel trim unit, possessed of the above advantages, in which the resilient force may be automatically adjusted to reach equilibrium at any point selected by the pilot, upon the actuating of controls bringing the feel trim unit into operation.

A further object of the invention lies in the provision of an improved feel trim unit in which the component parts are readily disassemblable as units disposed in separate housings, whereby servicing problems are reduced to a minimum.

Still another object of the invention lies in the provision of a feel trim unit, possessed of the above advantages, in which, through the use of lightweight materials, the maximum weight of the same is maintained at unusual low levels.

A feature of the invention lies in the ready adaptability of a single standardized form of device to a wide variety of applications.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIGURES 2A and 2B are fragmentary central longitudinal sectional views, partly in elevation.

FIGURE 3 is a transverse sectional view as seen from the plane 3—3 in FIGURE 2.

FIGURE 4 is a transverse sectional view as seen from the plane 4—4 in FIGURE 2.

Figure 1:
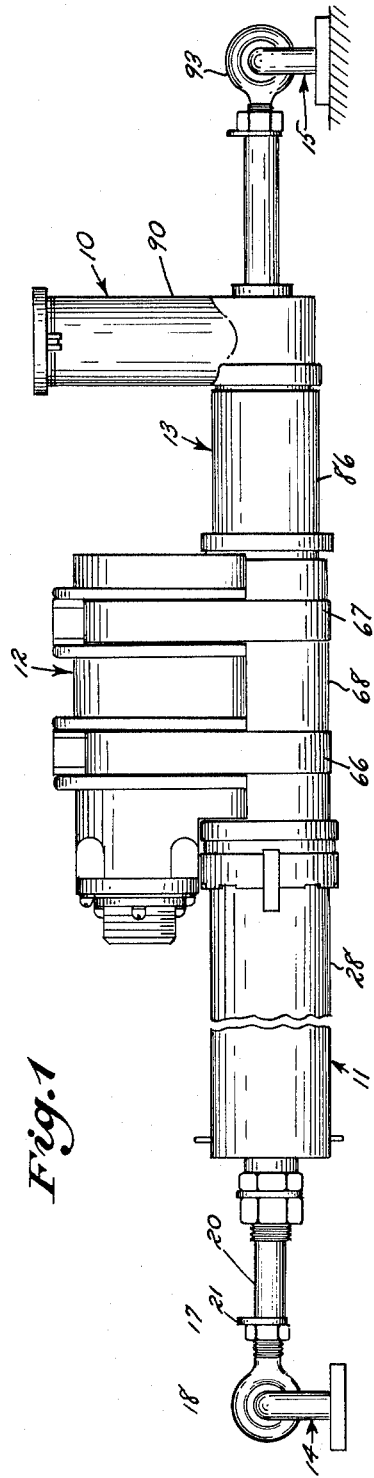
FIGURE 1 is a fragmentary view in perspective of an embodiment of the invention.

In accordance with the invention, the device, generally indicated by reference character 10, comprises broadly: a spring cartridge element 11, an electrically powered adjusting element 12, a locking element 13, and connecting link means 14 and 15, the former of which is attached directly to an aircraft control linkage and the latter of which is secured to a fixed member on the aircraft (not shown).

The spring cartridge element 11 includes a first elongated shaft member 17 having a terminal eye 18 and a threaded member 19. The shaft member 17 is adjustably and threadedly engaged with a second shaft member 20, and maintained in fixed relative position by a locking adjustment means 21 which may include a pinned nut 22 of well-known type. The second shaft member 20 includes internal threads 24 engaging the shaft member 17, and external threads 25 engaging a spring plunger member 26 through a second lockable adjusting means 27 similar to the means 21.

Figure 7:
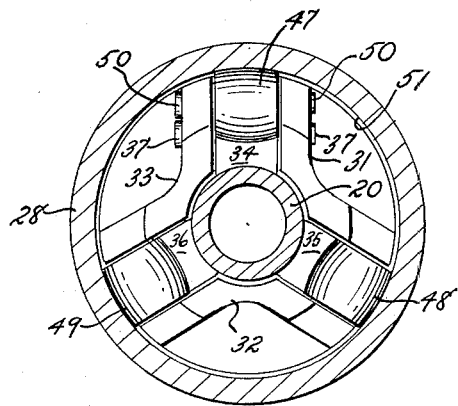
FIGURE 7 is a transverse sectional view as seen from the plane 7—7 in FIGURE 2.

Disposed within an elongated housing 28 are first and second roller bearing units 29 and 30, respectively, which are generally similar, each including a plurality of frame members 31, 32 and 33 (FIGURE 7) supporting roller bearings 34, 35 and 36 for rotation about pintles 37 (see FIGURE 7). The bearings 34–36 contact the surface of the shaft member 20, to permit axial movement therebetween. Disposed outwardly of unit 29 is a sealing member 40, having an outer surface 41 and an inner surface 42 which surround the inner surface 51 of the housing 28 and the unthreaded surface of the shaft 20, respectively, each of the surfaces 41–42 having an O-ring seal at 45 and 46, respectively.

At locations corresponding to the roller bearings 34, 35 and 36, and longitudinally spaced with respect thereto, are outer rollers 47, 48 and 49 mounted on pintles 50 which bear against the inner surface 51 of the housing 28. Notched portions 52 in the frame members 31, 32 and 33 of each of the units 29 and 30 provide a seat for a compression coil spring 53, having first and second ends at 54 and 55, respectively. The inner end 56 of the shaft 20 is provided with a flange 57 bearing against an annular member 58 which contacts a surface 59 of the second roller bearing unit 30. From a consideration of FIG- URE 2, it will be apparent that when the position of the housing 28 is fixed, motion imparted axially along the first and second shaft members 17 and 20, in either direction, will result in compressing the spring 53, which will tend to return the eye 18 to a predetermined position determined by the adjustment of the spring contact member 38 with respect to the shaft 20, the adjustment being locked by the means 27.

To facilitate assembly of the spring cartridge element 11, the housing 28 is provided with an outer plug (not shown) having threads engaging corresponding threads 61 on the housing. At the rightward end of the housing 28, there is provided an annular recess 63 engaged by an O-ring seal 64, whereby the spring cartridge unit is engaged with a detachable housing 65 which partially contains the adjusting element 12.

The adjusting element 12 and its separate housing 65 are maintained in engagement with the other elements comprising the device by a pair of strap members 66 and 67, which surround an intermediate housing 68 (see FIGURE 1). The strap members 66 and 67 are tightened by screw means 69 and 70 in well-known manner, and in the event of failure of the adjustment means, the entire element and its housing 65 may be removed for convenient replacement.

Disposed within the housing 65 is a subfractional electric motor 71, which most conveniently operates at 28 volts direct current, the field magnets 72 of the same being affixed to the housing 65, and surrounding an armature 73 mounted in bearings. The armature 73 is connected to a gear reduction unit 76, preferably of compound differential type, and having a motion output gear 77 extending through an opening 78 in the housing 65 and through a corresponding opening 79 in the intermediate housing 68. The gear 77 meshes with gear teeth 80 in a cylindrically-shaped sleeve 81 mounted in ball bearings 82. A portion of the sleeve 81 of relatively wider diameter indicated by reference character 83 is provided with screw threads 84 engaging internal threads 85 on an elongated housing 86, which partially encloses the locking element 13.

Figure 2A:
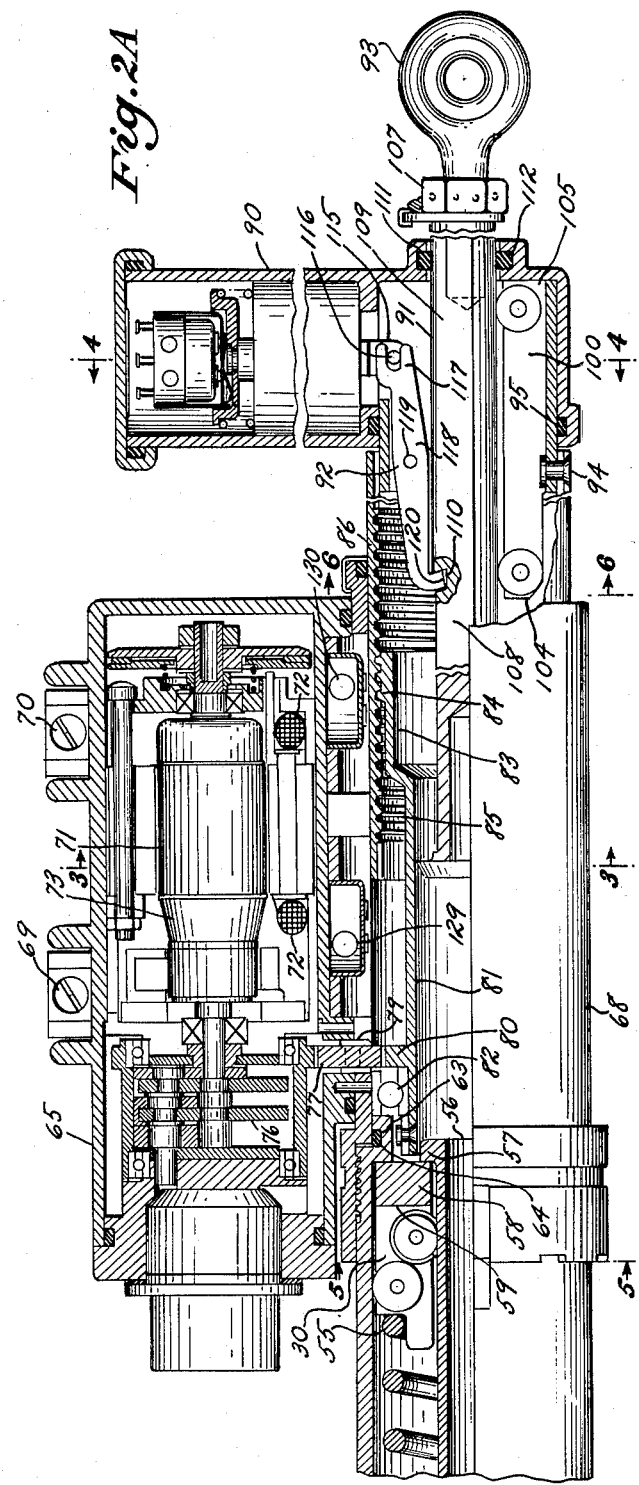
Figure 5:
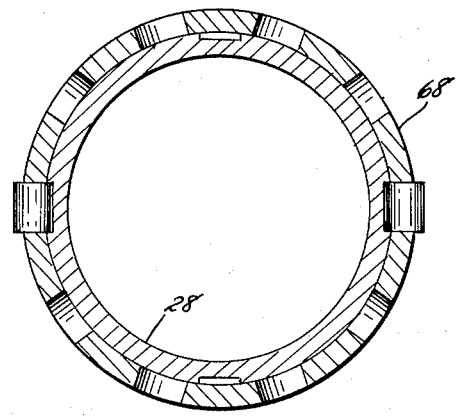
FIGURE 5 is a transverse sectional view as seen from the plane 5—5 in FIGURE 2.
Figure 6:
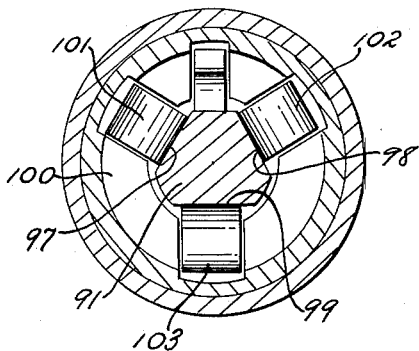
FIGURE 6 is a transverse sectional view as seen from the plane 6—6 in FIGURE 2.

The locking element 13 is disposed partly within the housing 86, and partially within a laterally-extending housing 90. As best seen in FIGURES 2, 3 and 4, the element 13 includes a shaft member 91, locking means 92, and a terminal eye 93 connected to means 15. The housings 86 and 90 maintain a fixed relationship during operation, and may thus be interconnected by screw means 94 and accompanying O-ring seal 95. The shaft member 91, as best seen in FIGURE 6, is of generally triangular cross section, and includes first, second and third planar surfaces 97, 98 and 99, and passes through a bearing cage 100 (see FIGURES 2 and 4) having first, second and third pairs of roller bearings, 101, 102 and 103, respectively, at the inner end 104 and outer end 105 thereof. The eye 93 is preferably provided with adjusting means 107, of a type described hereinabove.

Referring to FIGURE 2, it will be observed that the shaft member 91 includes a portion of relatively lesser width 108, and a portion of relatively greater width 109, which are separated by a locking notch 110. The portion adjacent the eye 93 passes through an opening 111 in the housing 90, and an O-ring seal 112.

Disposed in the laterally extending portion 113 of the housing 90 is a solenoid 114 including an armature link 115 having a pin 116 engaged by the clevis terminal 117 of a locking dog 118. The dog 118 is mounted for pivotal movement about a pin 119, and includes a lug terminal 120, selectively engageable in the notch or recess 110.

The armature link 115 is slidably disposed within an armature guide 121, and mounts thereupon a motion-transmitting cylinder 122 engaged with a motion-transmitting plate 123. Disposed beneath the plate 123, and bearing against a portion of a liner member 124, is a biasing spring 125 tending to move the armature link 115 to its uppermost position when the solenoid 114 is not energized.

Disposed immediately above the plate 123 are three microswitches 126a, 126b and 126c, the contact terminals of which engage either the plate 123 or the upper portion of the motion-transmitting cylinder 122. It will be observed that the solenoid 114 includes a main solenoid coil 127, and a small holding coil 128, the purpose of which will more fully appear hereinafter.

As best seen in FIGURES 2 and 3, limit switches 129 and 130 are provided to prevent overextension of the screw jack formed by the threaded interconnection of the housing 86 and the sleeve 81 in either direction. The limit switches are actuated by a wiper member 131 mounted directly on the sleeve 81 and selectively contacting either limit switch depending upon the relative position of the sleeve 81 and the housing 86. The wiper member 131 may also be employed to simultaneously operate a position potentiometer 134 (indicated in FIGURE 8), which may be connected to position-indicating means (not shown) in the cockpit of the aircraft adjacent the manually operated unlock switch 135.

*Operation*

Figure 8:
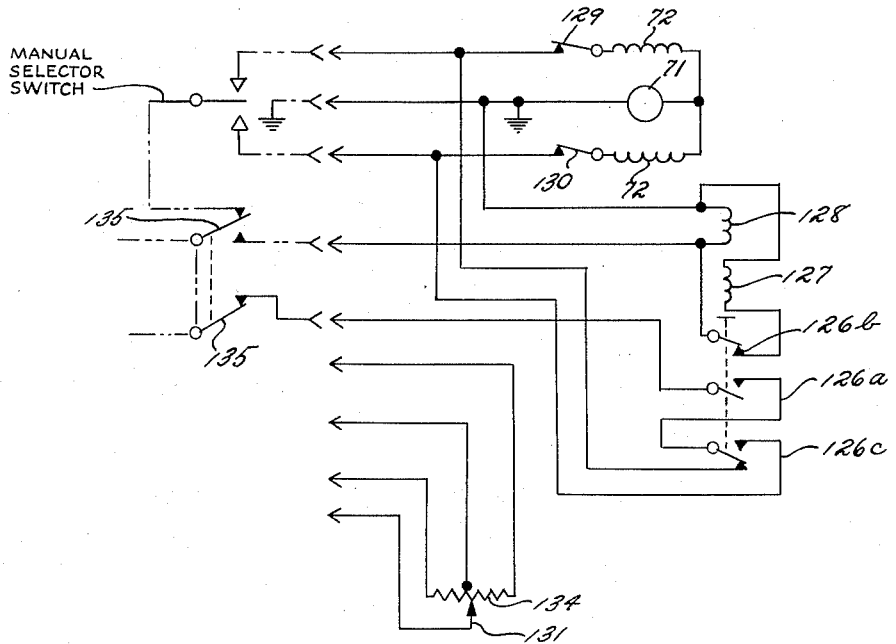
FIGURE 8 is an electrical schematic diagram showing the connections to electrically operated elements comprising the device.

During normal horizontal flight, where the normal flow of air over the control surfaces will provide adequate resistance to the stick control, the device 10 is rendered inoperative by positioning the switch 135 (FIGURE 8) in the unlocked position, which position will energize the holding coil 128. This coil generates sufficient magnetic flux, with minimum current consumption, to maintain the dog 118 out of the locking notch or recess 110. With movements of the control stick, the shaft member 91 will merely slide into and out of the housing 90 on the bearings 101–103 with a minimum of friction. Upon the commencement of hovering flight, a neutral stick position will be determined by the pilot, and the switch 135 will be moved to the locked position. As seen in FIGURE 8, this movement supplies current to the main solenoid coil 127, the limit switches 129 and 130, and the microswitches 126a, 126b and 126c. Depending upon the position of the adjusting element 12, that is to say the position of the housing 86 with respect to the screw threads 84 on the sleeve 81, with the energizing of the coil 127, the armature link 115 will be moved upwardly, and transmitted motion will cause the locking dog 118 to either enter the notch or recess 110, or contact the portion 108 or 109. Where the notch or recess 110 is immediately engaged, no further adjustment of the element 12 is necessary, and the pilot will immediately have a resilient force against which to push the stick control from its predetermined neutral position. In the event that the neutral position differs from the neutral position previously employed in hovering flight, the locking dog will be longitudinally displaced with respect to the recess 110, and adjustment is obtained by powered rotation of the sleeve 81, resulting in movement of the housing 86. As the axial location of the shaft member 91 is determined by the engagement of the eye 93 with a fixed member on the aircraft, adjustment of the housing results in moving the dog with respect to the notch.

Depending upon whether the dog falls on the portion 108 or 109, the armature link 115 will be located in either of two positions, which position will determine whether switch 126a or 126c is closed, each switch supplying current to the field magnet 72 in a different direction, which determines the direction of rotation of the armature 73 of the motor 71. The adjusting element 12 will then operate until the seating of the dog within the notch, thus completing the adjustment for the present neutral position of the stick control.

The main solenoid coil 127 remains energized during the continuation of hovering flight, or until such time as the switch 125 is moved to unlocked position. Upon the determining of a new neutral position for the stick control, the pilot may employ a manual selector switch (see FIGURE 8) to rotate the motor 71 in the required direction to bring the applied tension of the spring 53 to commence from movement of the stick control from the new neutral position. During this operation, the dog remains seated within the notch, it being unnecessary to open the switch 125.

I wish it to be understood that I do not consider the invention limited to the precise details of structure shown and set forth in this specification, for obvious modifications will occur to those skilled in the art to which the invention pertains.

I claim:

1. A feel trim unit for use in adding linear resistance to an aircraft control linkage, comprising: a resilient cartridge element, first linking means interconnected to said resilient cartridge element, said linking means being resiliently urged to a predetermined location by said resilient cartridge element, a housing connected to said resilient cartridge element, a second linking means slidably disposed within said housing, and means for selectively fixing the relative position of said second linking means and said housing, said last-mentioned means including said linking means having a recess therein, and a locking dog pivotally mounted upon said housing and selectively projectable into said recess.

2. A feel trim unit for use in adding linear resistance to an aircraft control linkage, comprising: a resilient cartridge element, first linking means interconnected to said resilient cartridge element, said linking means being resiliently urged to a predetermined location by said resilient cartridge element, a housing connected to said resilient cartridge element, a second linking means slidably disposed within said housing, means for selectively fixing the relative position of said second linking means and said housing in locked condition, and means for varying the relative position of said second linking means and said housing at which a locked condition may occur.

3. A feel trim unit for use in adding linear resistance to an aircraft control linkage, comprising: a resilient cartridge element, first linking means interconnected to said resilient cartridge element, said linking means being resiliently urged to a predetermined location by said resilient cartridge element, a housing connected to said resilient cartridge element, a second linking means slidably disposed within said housing, means for selectively fixing the relative position of said second linking means and said housing in locked condition, and means for varying the relative position of said second linking means and said housing at which a locked condition may occur, said last-mentioned means including an electrically-driven screw jack disposed within said housing, and varying the relative position between said housing and said spring cartridge unit.

4. A feel trim unit for use in adding linear resistance to an aircraft control linkage, comprising: a resilient cartridge element, first linking means interconnected to said resilient cartridge element, said linking means being resiliently urged to a predetermined location by said resilient cartridge element, a housing connected to said resilient cartridge element, a second linking means slidably disposed within said housing, means for selectively fixing the relative position of said second linking means and said housing in locked condition, and means for varying the relative position of said second linking means and said housing at which a locked condition may occur, said last-mentioned means including an electrically-driven screw jack disposed within said housing, and varying the relative position between said housing and said spring cartridge unit, said second linking means having means thereon for directing the direction of rotation of said screw jack, upon the supplying of an electric current to said screw jack.

5. A feel trim unit for use in adding linear resistance to an aircraft control linkage, comprising: a resilient cartridge element, first linking means interconnected to said resilient cartridge element, said linking means being resiliently urged to an adjusted predetermined location with respect to said cartridge element, a first housing connected to said resilient cartridge element, a second housing adjustably connected to said first housing, second linking means slidably disposed within said second housing, means on said second housing for selectively fixing the position of said second linking means with respect to said second housing, and means for varying the position of said first housing with respect to said second housing.

6. A feel trim unit for use in adding linear resistance to an aircraft control linkage, comprising: a resilient cartridge element, first linking means interconnected to said resilient cartridge element, said linking means being resiliently urged to an adjusted predetermined location with respect to said cartridge element, a first housing connected to said resilient cartridge element, a second housing adjustably connected to said first housing, second linking means slidably disposed within said second housing, means on said second housing for selectively fixing the position of said second linking means with respect to said second housing, and screw jack means for varying the position of said first housing with respect to said second housing.

References Cited in the file of this patent
UNITED STATES PATENTS

| | | |
|---|---|---|
| 2,639,108 | Feeney et al. | May 19, 1953 |
| 2,719,684 | Peed | Oct. 4, 1955 |
| 2,801,060 | Bonsteel et al. | July 30, 1957 |
| 2,823,879 | Smith et al. | Feb. 18, 1958 |